United States Patent Office 3,236,861
Patented Feb. 22, 1966

3,236,861
ORGANIC IMIDO COMPOUNDS
Colin William Greenhalgh, Worsley, Walkden, Manchester, England, assignor to Ilford Limited, Ilford, England, a British company
No Drawing. Filed Jan. 8, 1964, Ser. No. 336,369
Claims priority, application Great Britain, Dec. 23, 1959, 43,668/59
5 Claims. (Cl. 260—326)

This invention relates to new chemical compounds and to their production.

This application is a continuation-in-part of application Serial No. 75081 filed December 12, 1960 now Patent No. 3,161,512.

It is an object of the present invention to provide a new class of chemical compounds which have particular utility as chemical intermediates in the production of colour couplers which can be added to photosensitive emulsions for use in colour photography as described in application Serial No. 75081. These compounds are of especial value in this connection because when they are combined with a colour coupler residue to produce a colour coupler they introduce simultaneously a group conferring non-diffusion properties and a water-solubilising group which is protected. These compounds can also be used in a similar manner to introduce non-diffusing and water-solubilising groups into dyestuffs. Yet other uses for these compounds are as wool, gelatin and cotton modifiers, and the hydrolysed forms of the compounds are also useful as dispersing agents.

According to a first feature of the present invention there is provided, as a new class of chemical compounds, compounds of the Formula I:

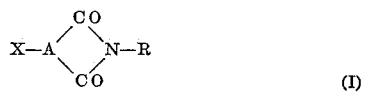
(I)

where A is a trivalent radical selected from the class consisting of:

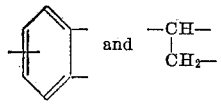

and X is selected from the class consisting of —CO halogen, —CH$_2$CO halogen, —SCH$_2$CO halogen, —SO$_2$ halogen and —N=C=O, and R is selected from the class consisting of alkyl of at least 12 carbon atoms and an aryl group of the benzene series containing a said alkyl group.

According to a further feature of the invention chemical compounds of Formula I above wherein X is selected from —CO halogen, —CH$_2$CO halogen, —SCH$_2$CO halogen and —SO$_2$ halogen are prepared by condensing a compound of the Formula II:

(II)

wherein A has the meaning assigned to it above and R' is selected from the class consisting of —COOH, —CH$_2$COOH, —SCH$_2$COOH, —SO$_3$H with RNH$_2$ where R has the meaning assigned to it above to produce a compound of the Formula III:

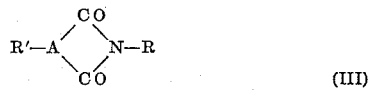
(III)

wherein R', A and R all have the meanings assigned to them above, whereafter the compound

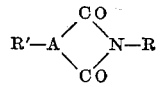

of Formula III above is reacted with a halogenating agent to produce a compound of Formula I above wherein A and R have the meanings assigned to them above and X is selected from the class consisting of —CO halogen, —CH$_2$CO halogen, —SCH$_2$CO halogen and —SO$_2$ halogen.

In a preferred embodiment thionyl chloride is the halogenating agent used.

In another embodiment of the invention the halogenating agent used is a phosphorus halide.

In a further feature of this invention in order to prepare the compound of Formula III wherein R' is HOOC—CH$_2$—S— a compound of the formula $$HOOC-CH_2-S-A\begin{matrix}COOH\\COOH\end{matrix}$$

where A has the meaning assigned to it above, is reacted with R—NH$_2$, where R has the meaning assigned to it above, preferably at about 180° C.

In another feature of the invention in order to prepare a compound of the Formula IV:

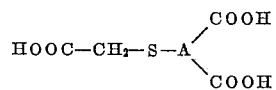
(IV)

wherein A and R have the meanings assigned to them above, a compound of the Formula V:

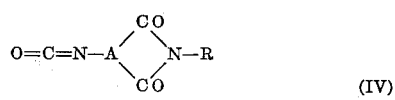
(V)

is reacted with R—NH$_2$ wherein R has the meaning assigned to it above, to produce a compound of the Formula VI:

(VI)

The compound of Formula VI above is then reduced to produce a compound of the Formula VII:

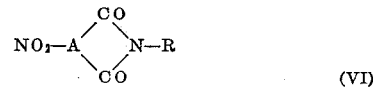
(VII)

and the compound of Formula VII is then reacted with carbonyl chloride COCl$_2$ to produce the compound of Formula IV.

Compounds of Formula I above may be reacted with a colour coupler residue of the formula B—NH$_2$ to form a colour coupler of the Formula VIII:

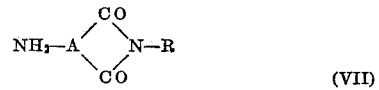
(VIII)

wherein A and R have the usual meanings, Y is a —CO—, —CH$_2$CO—, —SCH$_2$CO, —SO$_2$— or

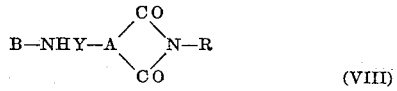

group, and B is a grouping such that the compound BNH$_2$ is a compound which will react with the oxidation products of N.N-diethyl p-phenyl diamine, formed during the development of a silver salt image with that compound, to yield a quinone-imine or azamethine dyestuff. In compounds of formula VIII the group R comprises at least 12 carbon atoms; this group makes the colour coupler non-diffusing in a gelatin medium. The ring structure

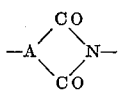

which is present in all compounds of Formula I and hence VIII is a protected water-solubilising group in that the colour coupler can be obtained in a pure form without affecting this group but when the colour couplers are incorporated in a photographic emulsion by taking them up in a dilute alkali, e.g., dilute sodium hydroxide, the alkali has the effect of opening the ring structure to afford a free carboxylic group imparting solubility to the compound.

Thus when compounds of Formula I are condensed with a $BNH_2$ compound to form a colour coupler the compounds of Formula I have introduced simultaneously a group conferring non-diffusing properties and a group conferring water-solubilising properties.

The following examples will serve to illustrate the invention:

*Example 1.—4-chlorocarbonyl-N-n-octadecylphthalimide*

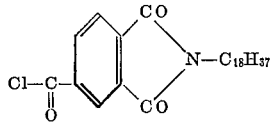

10 parts of 4-carboxy-N-octadecylphthalimide and 40 parts of thionyl chloride is heated under reflux for ½ hour and then evaporated to dryness under reduced pressure. The acid chloride is obtained as a colourless crystalline solid melting at 70–72° C. and on analysis is found to contain 2.8% of nitrogen and 8.2% chlorine ($C_{27}H_{40}O_3NCl$ requires 3.05% of nitrogen and 7.7% of chlorine).

4-carboxy-N-n-octadecylphthalimide itself may be obtained as follows:

9.6 parts of trimellitic anhydride is added to a hot solution of 13.4 parts of octadecylamine in 30 parts of acetic acid and the solution obtained heated at the boil for one hour. After cooling the mixture is diluted with diethyl ether, filtered and the product washed with diethyl ether and dried. The acid is obtained as colourless crystals melting at 136–138° C.

*Example 2.—4-isocyanato-N-n-octadecylphthalimide*

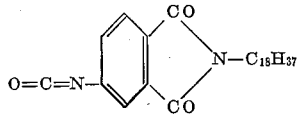

A solution of 8.3 parts of 4-amino-N-octadecylphthalimide in 50 parts of dry toluene is added to 50 parts of dry toluene previously saturated with phosgene at 25° C. The suspension obtained is stirred at 25° C. for 2 hours and then heated to the boil and maintained at the boil for 15 minutes. During this time a slow stream of phosgene is passed through the solution which is obtained. After cooling the colourless crystalline product is filtered off, washed with petroleum ether and dried to give 6.5 parts of 4-isocyanato-N-n-octadecyl-phthalimide melting at 94–96° C.

The 4-amino-N-n-octadecylphthalimide itself may be obtained as follows:

26.9 parts of n-octadecylamine are added to a hot solution of 19.3 parts of 4-nitrophthalic anhydride in 40 parts of acetic acid and the solution obtained heated under reflux for one hour. After cooling and dilution with diethyl ether the product is filtered off, washed with diethyl ether and dried to give 36 parts of 4-nitro-N-n-octadecylphthalimide as colourless plate crystals melting at 92–94° C. The 36 parts of nitro compound in 500 parts of ethyl acetate is then hydrogenated under pressure at 60–65° C. for 6 hours using Raney nickel as catalyst and the amine obtained recrystallised from ethyl acetate. The 4-amino-N-n-octadecylphthalimide is obtained as lemon yellow crystals having melting point 90–92° C. and on analysis is found to contain 75.5% of carbon, 10.4% of hydrogen and 6.7% of nitrogen ($C_{26}H_{42}O_2N_2$ requires 75.35% of carbon, 10.15% of hydrogen and 6.75% of nitrogen).

*Example 3.—α[N(4-n-dodecylphenyl)succinimido]-acetyl chloride*

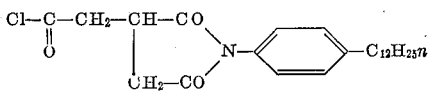

A mixture of 47 parts of α[N(4-n-dodecylphenyl)succinimido] acetic acid and 80 parts of thionyl chloride is heated under reflux for one hour and the solution evaporated to dryness. The residual solid is crystallised from a mixture of 50 parts of chloroform and 200 parts of a petroleum ether fraction boiling between 60 and 80° C. to give the acid chloride as colourless crystals melting at 92–94° C. On analysis the acid chloride is found to contain 69.1% of carbon, 7.8% of hydrogen, 3.4% of nitrogen and 8.5% of chlorine. ($C_{24}H_{34}O_3NCl$ requires 68.65% of carbon, 8.1% of hydrogen, 3.35% of nitrogen, and 8.45% of chlorine.)

The α[N(4 - n - dodecylphenyl)succinimido]acetic acid itself may be prepared in the following manner:

A mixture of 31.6 parts of tricarballylic anhydride, 52 parts of 4-n-dodecylaniline and 120 parts of acetic acid is heated under reflux for 2 hours, then cooled to 50° C. and diluted with an equal volume of methanol. After further cooling the precipitated product is filtered off, washed with methanol and twice recrystallised from ethyl acetate to give α[N(4 - n - dodecylphenyl)succinimido]-acetic acid as colourless crystals melting at 122–124° C. which on analysis are found to contain 3.5% of nitrogen. ($C_{24}H_{35}O_4N$ requires 3.4% of nitrogen.)

The tricarballylic anhydride itself may be prepared in the following manner:

A mixture of 108 parts of tricarballylic acid and 108 parts of acetyl chloride is stirred and heated under reflux for 6 hours and the solution obtained diluted with 750 parts chloroform. After keeping for 24 hours at 20° C. the tricarballylic anhydride is filtered off, washed with chloroform and dried. The anhydride melts at 128–130° C.

*Example 4.—α[N(4-n-dodecylphenyl)succinimidothio]-acetyl chloride*

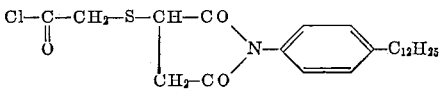

A solution of 9 parts of α[N(4-n-dodecylphenyl)succinimidothio]acetic acid in 20 parts of thionyl chloride is heated under reflux for ½ hour, and then evaporated to dryness under reduced pressure. The residue so obtained is crystallised from a petroleum fraction boiling between 60 and 80° C. to give the acid chloride as pale yellow micro crystals melting at 80–82° C.

The α[N(4 - n - dodecylphenyl)succinimidothio]acetic acid itself is prepared as follows:

A mixture of 10.4 parts of carboxymethylmercaptosuccinic acid and 13 parts of 4-n-dodecylaniline is stirred and heated at 180° C. for 1½ hours when no more water is being evolved. The reaction mixture is cooled and crystallised first from a petroleum fraction boiling between 60 and 80° C. and then twice from a benzene/methylcyclohexane mixture to give the acid as colourless micro crystals melting at 136–138° C.

(Found: 66.3% of carbon, 8.0% of hydrogen and 3.5% of nitrogen. C$_{24}$H$_{35}$O$_4$NS requires 66.5% of carbon, 8.1% of hydrogen and 3.25% of nitrogen.)

The following compounds of general Formula I may be prepared analogously:

4-chlorocarbonyl-N-n-dodecylphthalimide. This compound melts at 58–60° C. and is derived from 4-carboxy-N-n-dodecylphthalimide which melts at 136–138° C.

4 - chlorocarbonyl - N - n-tetradecylphthalimide. This compound melts at 59–61° C. after recrystallisation from a petroleum fraction boiling between 60 and 70° C. 4-carboxy-N-n-tetradecylphthalimide from which the acid chloride is derived melts at 136–137° C. after recrystallisation from ethyl acetate. (Found: 70.9% carbon, 8.3% hydrogen and 3.5% nitrogen. C$_{33}$H$_{33}$O$_4$N requires 71.3% carbon, 8.5% hydrogen and 3.6% of nitrogen.)

4 - chlorocarbonyl - N - n-hexadecylphthalimide. This compound melts at 62–64° C. after recrystallisation from a petroleum fraction boiling between 60 and 80° C. The 4-carboxy-N-n-hexadecylphthalimide from which it is derived melts at 138–140° C. after recrystallisation from methanol. (Found: 72.2% of carbon, 8.7% of hydrogen and 3.2% of nitrogen. C$_{25}$H$_{37}$O$_4$N requires 72.5% of carbon, 8.9% of hydrogen and 3.4% of nitrogen.)

4 - chlorocarbonyl-N-(4-n-dodecylphenyl)phthalimide. This compound melts at 128–130° C. after recrystallisation from a mixture of benzene and petroleum fraction boiling point 80–100° C. (1:1). The 4-carboxy N(4-n-dodecylphenyl)phthalimide from which it is derived melts at 218–220° C. after recrystallisation from acetic acid. (Found: 74.3% of carbon, 7.6% of hydrogen and 3.4% of nitrogen. C$_{27}$H$_{33}$O$_4$N requires 74.45% of carbon, 7.6% of hydrogen and 3.2% of nitrogen.)

α(N - n - octadecylsuccinimido)acetyl chloride. This compound is a waxy solid which is derived from α(N-n-octadecylsuccinimido)acetic acid, which is a colourless solid melting at 87–90° C. (Found: 3.4% of nitrogen. C$_{24}$H$_{23}$O$_4$N requires 3.4% of nitrogen.)

I claim as my invention:
1. 4-chlorocarbonyl-N-n-octadecylphthalimide.
2. 4-isocyanato-N-n-octadecylphthalimide.
3. α[N(4 - n - dodecylphenyl)succinimido]acetyl chloride.
4. α[N(4 - n - dodecylphenyl)succinimidothio]acetyl chloride.
5. A chemical compound of the formula:

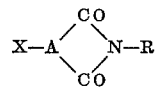

where A is a trivalent radical selected from the class consisting of:

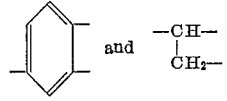

linked to yield a said chemical compound of the formula

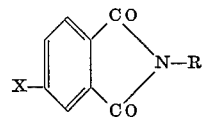

and a said chemical compound of the formula

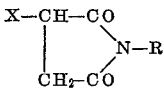

respectively, X is selected from the class consisting of —COCl, —CH$_2$COCl, —SCH$_2$COCl, and —N=C=O, and R is selected from the class consisting of an alkyl group of 12 to 18 carbon atoms and a phenyl group containing an alkyl substituent of 12 to 18 carbon atoms.

References Cited by the Examiner

UNITED STATES PATENTS

| | | | |
|---|---|---|---|
| 2,452,315 | 10/1948 | Morgan et al. | 260—326 |
| 2,628,964 | 2/1953 | Scalera et al. | 260—326.5 |
| 2,663,714 | 12/1953 | Kornfeld | 260—326.5 |

OTHER REFERENCES

Migrdichian: Organic Synthesis, vol. 1, New York, Reinhold Publishing Corp., 1957, pages 359–360 and 473.

NICHOLAS S. RIZZO, *Primary Examiner.*

MARY O'BRIEN, *Assistant Examiner.*